(12) United States Patent
Park

(10) Patent No.: US 8,890,536 B2
(45) Date of Patent: Nov. 18, 2014

(54) SECONDARY BATTERY WITH APPARATUS FOR CHECKING THE STATE OF A SERVICE PLUG

(75) Inventor: Jongdoo Park, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 455 days.

(21) Appl. No.: 12/819,982

(22) Filed: Jun. 21, 2010

(65) Prior Publication Data

US 2011/0050204 A1 Mar. 3, 2011

(30) Foreign Application Priority Data

Aug. 26, 2009 (KR) .................... 10-2009-0079175

(51) Int. Cl.
*G01R 31/08* (2006.01)
*H01M 2/20* (2006.01)
*H01M 10/48* (2006.01)
*H01M 2/34* (2006.01)
*H01M 2/30* (2006.01)

(52) U.S. Cl.
CPC ............ *H01M 10/482* (2013.01); *H01M 2/206* (2013.01); *H01M 2/34* (2013.01); *H01M 2/30* (2013.01); *H01M 10/486* (2013.01); *Y02E 60/12* (2013.01)
USPC ........... 324/522; 324/523; 324/426; 320/116; 320/121

(58) Field of Classification Search
CPC ............. G01R 31/3658; G01R 31/362; G01R 19/145; G01R 19/155; H01R 11/281
See application file for complete search history.

(56) References Cited

U.S. PATENT DOCUMENTS

| 6,437,540 | B2* | 8/2002 | Sonobe | 320/134 |
|---|---|---|---|---|
| 7,570,025 | B2* | 8/2009 | Kim | 320/150 |
| 7,614,651 | B2* | 11/2009 | Uchida | 280/735 |
| 7,680,613 | B2* | 3/2010 | Lim et al. | 702/63 |
| 7,990,154 | B2* | 8/2011 | Ohnuki | 324/426 |
| 8,054,043 | B2* | 11/2011 | Yano | 320/118 |
| 8,134,338 | B2* | 3/2012 | Choi | 320/134 |
| 2002/0017405 | A1* | 2/2002 | Nada | 180/65.2 |

(Continued)

FOREIGN PATENT DOCUMENTS

| JP | 07-212918 | * | 8/1995 | 11/18 |
|---|---|---|---|---|
| JP | 2004-007919 | A | 1/2004 | |

(Continued)

OTHER PUBLICATIONS

Korean Notice of Allowance for corresponding Korean Patent Application No. 10-2009-0079175, dated Apr. 20, 2011, 5pp.

(Continued)

*Primary Examiner* — Richard Isla Rodas
(74) *Attorney, Agent, or Firm* — Christie, Parker & Hale, LLP

(57) ABSTRACT

A secondary battery capable of ensuring operator safety by checking whether a service plug is opened or closed. The secondary battery includes a battery pack having a plurality of battery cells, a service plug coupled between each of the plurality of battery cells through a pair of plug terminals for controlling interconnection of the plurality of battery cells according to whether the pair of plug terminals contact the battery cells, and a battery management system connected to the battery pack and the service plug for determining whether the service plug is opened or closed by measuring at least one selected from the group consisting of a voltage and a current of the battery pack and voltages of the plurality of battery cells connected to the service plug.

4 Claims, 2 Drawing Sheets

(56) References Cited

U.S. PATENT DOCUMENTS

| | | |
|---|---|---|
| 2007/0090798 A1 | 4/2007 | Yun et al. |
| 2007/0291425 A1* | 12/2007 | Yugou .......................... 361/23 |
| 2008/0211459 A1 | 9/2008 | Choi |
| 2009/0039703 A1* | 2/2009 | Soma et al. .................. 307/10.1 |
| 2011/0286137 A1* | 11/2011 | Bosch et al. .................... 361/78 |

FOREIGN PATENT DOCUMENTS

| | | |
|---|---|---|
| JP | 2004-007985 A | 1/2004 |
| KR | 2003-0065757 A | 8/2003 |
| KR | 10-2007-0043149 A | 4/2007 |
| KR | 10-2008-0080864 A | 9/2008 |
| KR | 10-2008-0110665 A | 12/2008 |

OTHER PUBLICATIONS

Patent Abstracts of Japan and English Machine Translation of Japanese Publication 2004-007919 A, 20 pages.

Patent Abstracts of Japan and English Machine Translation of Japanese Publication 2004-007985 A, 14 pages.

* cited by examiner

SECONDARY BATTERY WITH APPARATUS FOR CHECKING THE STATE OF A SERVICE PLUG

CROSS-REFERENCE TO RELATED APPLICATION

This application claims priority to and the benefit of Korean Patent Application No. 10-2009-0079175, filed on Aug. 26, 2009, the entire content of which is incorporated herein by reference.

BACKGROUND OF THE INVENTION

1. Field of the Invention

An aspect of the present invention relates to a secondary battery.

2. Description of the Related Art

In general, unlike primary batteries which are not rechargeable, secondary batteries can be charged and discharged. Low-capacity secondary batteries are widely employed in electronic devices such as cellular phones, laptop computers, and camcorders while large-capacity secondary batteries are typically used for driving motors of electric automobiles or hybrid automobiles.

When battery cells are used in electric automobiles in particular, a problem associated with limited power capacity may arise. To address the problem, a battery pack which includes a plurality of battery cells connected to each other in series/parallel has been proposed. In such a battery pack having a number of interconnected battery cells, the overall voltage of the battery pack can be increased. Further, the battery pack can be configured to have various capacities and voltages according to the number of battery cells connected to each other, thereby improving versatility in terms of capacity and voltage outputs.

Since the battery pack outputs a relatively high voltage, when operators conduct a maintenance work or the like, measures for ensuring operator safety are desirable.

SUMMARY OF THE INVENTION

An aspect of the present invention provides a secondary battery capable of ensuring operator safety by checking whether a service plug is opened or closed.

According to some aspects of the present invention, a secondary battery includes a battery pack having a plurality of battery cells; a service plug coupled between each of the plurality of battery cells via a pair of plug terminals for controlling interconnection of the plurality of battery cells according to whether the pair of plug terminals are electrically coupled to the battery cells; and a battery management system (BMS) connected to the battery pack and the service plug for determining whether the service plug is opened or closed by measuring at least one selected from the group consisting of a voltage and a current of the battery pack, and voltages of the plurality of battery cells electrically coupled to the service plug.

Here, the battery management system may determine that the service plug is opened when it measures at least one selected from the group consisting of the maximum measurable value constituting the voltage of the battery pack and 0 A constituting the current of the battery pack, and when the voltage of the battery cell measured by the battery management system is the maximum measurable value.

In addition, the battery management system may measure voltages of the plurality of battery cells connected to the service plug such that the pair of plug terminals of the service plug are both included in the measurement path.

In addition, the battery management system may measure a voltage of the battery pack such that the pair of plug terminals of the service plug are both included in the measurement path.

Further, the battery management system may determine whether the service plug is opened or closed by measuring a voltage or a current of the battery pack.

In addition, when the voltage of the battery pack is the maximum measurable value and the current of the battery pack is 0 A, the battery management system may determine that the service plug is opened.

The battery management system may be connected to the service plug to form a closed loop and determine whether the service plug is opened or closed by applying a current to the closed loop. When no current is applied to the closed loop, the battery management system may determine that the service plug is opened. The battery management system may output information on whether the service plug is opened or closed to an external display unit.

In some embodiments, the present invention is a secondary battery including: a battery pack having a plurality of battery cells; a cell voltage measuring unit for measuring voltages of the plurality of battery cells; a pack voltage measuring unit for measuring a voltage of the battery pack; a pack current measuring unit for measuring a current of the battery pack; a temperature measuring unit for measuring a temperature of the battery pack; an internal power supply unit; a service plug coupled between each of the plurality of battery cells via a pair of plug terminals for controlling interconnection of the plurality of battery cells; a loop current measuring unit forming a closed loop with the internal power supply unit and the service plug for measuring a current of the closed loop; and a battery management system electrically coupled to the battery pack and the service plug for estimating a state of charge and a state of health of the battery pack based on the measured voltages, currents, and temperature.

In some embodiments, the present invention is a secondary battery including: a battery pack having a plurality of interconnected battery cells; a service plug coupled between each of the plurality of battery cells via a pair of plug terminals for controlling interconnection of the plurality of battery cells according to a state of the pair of plug terminals; and a battery management system electrically coupled to the battery pack and the service plug for determining the state of the pair of plug terminals by measuring voltages of the plurality of battery cells electrically coupled to the service plug such that the pair of plug terminals of the service plug are both included in the measurement path.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE INVENTION

The construction of a secondary battery according to an exemplary embodiment of the present invention will now be described in detail with reference to the accompanying drawings.

Figure 1:
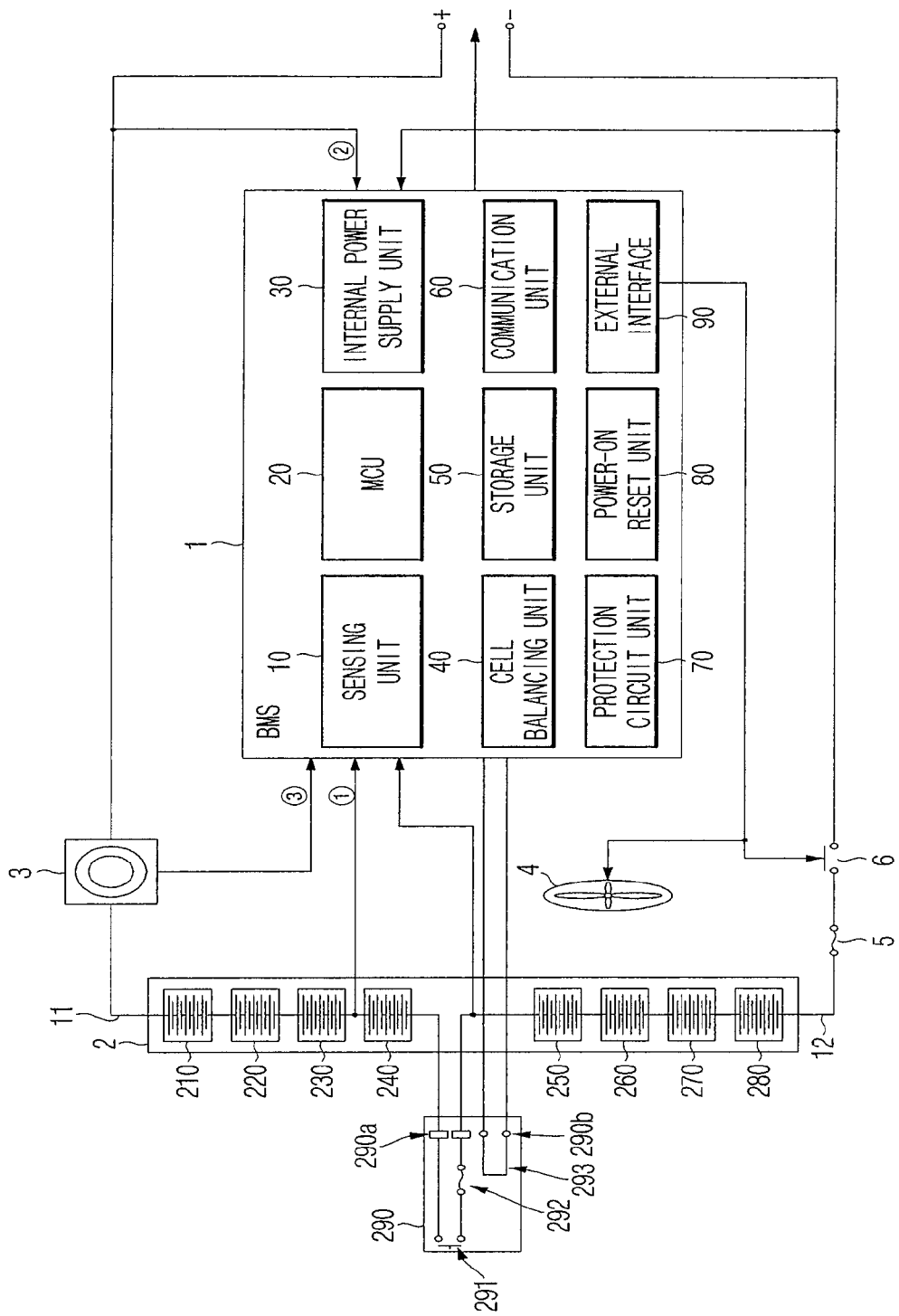
FIG. 1 shows a schematic diagram of a secondary battery, according to an exemplary embodiment of the present invention.
Figure 2:
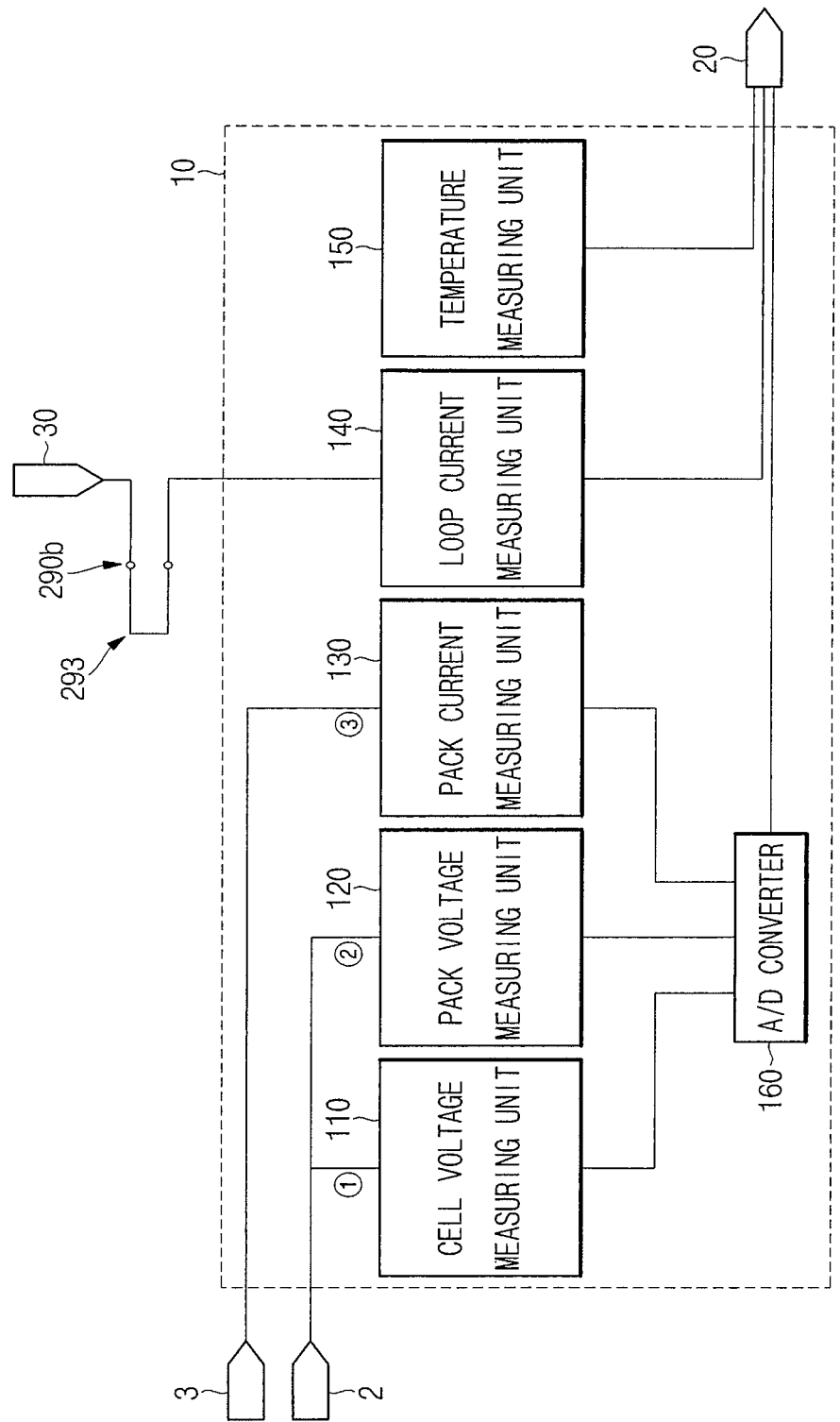
FIG. 2 shows a detailed diagram of a sensing unit used in the secondary battery, according to an exemplary embodiment of the present invention.

FIG. 1 is a schematic diagram of a secondary battery, according to an exemplary embodiment of the present invention, and FIG. 2 is a detailed diagram of a sensing unit used in the secondary battery, according to an exemplary embodiment of the present invention.

Referring to FIG. 1, the secondary battery according to an exemplary embodiment of the present invention includes a battery management system (BMS) 1 and a battery pack 2. The secondary battery may further include a current sensor 3, a cooling fan 4, a fuse element 5, and a charge/discharge switch 6.

The BMS 1 includes a sensing unit 10 and a monitor control unit (MCU) 20. The BMS 1 may further include an internal power supply unit 30, a cell balancing unit 40, a storage unit 50, a communication unit 60, a protection circuit unit 70, a power-on reset unit 80, and an external interface 90.

The sensing unit 10 is electrically coupled to the battery pack 2 and the current sensor 3.

The sensing unit 10 measures an overall voltage of the battery pack 2, and voltages of subpacks 210 to 280 and/or battery cells constituting each of the subpacks 210 to 280. In addition, the sensing unit 10 measures currents flowing through the charge and discharge lines 11 and 12 and the battery pack 2 by the current sensor 3.

To this end, the sensing unit 10 includes a cell voltage measuring unit 110 electrically coupled to the battery pack 2, a pack voltage measuring unit 120, a pack current measuring unit 130 electrically coupled to the current sensor 3, and a loop current measuring unit 140 forming a closed loop with the internal power supply unit 30. The sensing unit 10 may further include a temperature measuring unit 150 measuring a temperature of the battery pack 2 and an ambient temperature, and an A/D converter 160 converting the analog voltage and current signals measured by the cell voltage measuring unit 110 and the pack current measuring unit 130 into digital voltage and current signals.

The cell voltage measuring unit 110 measures the voltages of the subpacks 210 to 280 and/or the voltages of battery cells constituting each of the subpacks 210 to 280. In particular, as indicated by a line labeled ①, the cell voltage measuring unit 110 measures the voltages of the subpacks 240 and 250 coupled to the service plug 290, or the voltages of battery cells connected to the service plug 290 in the subpacks 240 and 250. The cell voltage measuring unit 110 measures the voltages of battery cells connected to the service plug 290 such that the plug terminal 290a of the service plug 290 is incorporated in the cell voltage measuring unit 110. Accordingly, when the service plug 290 is coupled between the subpacks 240 and 250, voltages of the subpacks 240 and 250 or the battery cells connected to the service plug 290 are measured by the cell voltage measuring unit 110. Further, when the service plug 290 is opened, that is, the service plug 290 is disconnected from the subpacks 240 and 250, the voltage measured by the cell voltage measuring unit 110 is close to infinity. As a result, the voltage value shown on the cell voltage measuring unit 110 becomes the maximum measurable value.

The pack voltage measuring unit 120 is connected to charge and discharge current lines 11 and 12 of the battery pack 2. As indicated by a line labeled ②, the pack voltage measuring unit 120 measures the voltage of the battery pack 2. The service plug 290 is provided between the plurality of subpacks 210 to 280 of the battery pack 2. Accordingly, when the service plug 290 is connected, the pack voltage measuring unit 120 may measure the voltage of the battery pack 2. However, when the service plug 290 is opened, the voltage measured by the pack voltage measuring unit 120 is close to infinity. As a result, the voltage value shown on the pack voltage measuring unit 120 becomes the maximum measurable value.

The pack current measuring unit 130 is connected to the charge and discharge current lines 11 and 12. As indicated by a line labeled ③, the pack current measuring unit 130 measures the current flowing in the charge and discharge current lines 11 and 12 and the current flowing in the battery pack 2 by the current sensor 3. When the service plug 290 is coupled between the subpacks 210 to 280, the pack current measuring unit 130 measures the current passing through the battery pack 2. On the other hand, when the service plug 290 is opened, current is not allowed to flow in the charge and discharge current lines 11 and 12 and accordingly, the current measured by the pack current measuring unit 130 becomes 0 A.

The loop current measuring unit 140 forms a closed loop 293 with the internal power supply unit 30 and the service plug 290. The current flowing in the closed loop 293 is derived from a power supply of the internal power supply unit 30. In some embodiments, the closed loop 293 may be formed using a separate external voltage source or a current source in addition to the internal power supply unit 30. The loop current measuring unit 140 measures a current flowing in the closed loop 293. When the service plug 290 is coupled between the subpacks 210 to 280, the closed loop 293 is also maintained in a connected state, so that the loop current measuring unit 140 measures the current flowing in the closed loop 293. On the other hand, when the service plug 290 is opened, the closed loop 293 is also opened, so that current is not allowed to flow in the closed loop 293. Accordingly, the current measured by the loop current measuring unit 140 becomes 0 A.

The temperature measuring unit 150 measures a temperature of the battery pack 2 and an ambient temperature. A signal indicative of the temperature measured by the temperature measuring unit 150 is delivered to the MCU 20, and when the temperature of the battery pack 2 is higher than a reference level, the MCU 20 controls the charging or discharging operation of the battery pack 2.

The A/D converter 160 is connected to the cell voltage measuring unit 110, the pack voltage measuring unit 120 and the pack current measuring unit 130. The A/D converter 160 converts the cell voltage, subpack voltage, pack voltage and pack current analog values into digital signals. Here, the cell voltage and subpack voltage values are measured by the cell voltage measuring unit 110, the pack voltage value is measured by the pack voltage measuring unit 120, and the pack current value is measured by the pack current measuring unit 130, respectively. The A/D converter 160 applies the digitally converted voltage values and current values to the MCU 20.

The MCU 20 estimates a state of charge (SOC) and a state of health (SOH) of the battery pack 2 based on the voltage values and temperature values received from the sensing unit 10. The MCU 20 also controls charging and discharging operations of the battery pack 2. That is, in the event of overcharging of the battery pack 2, the MCU 20 may cut off paths of the charge and discharge current lines 11 and 12 by the main switch 6. When the service plug 290 is opened, that is, when the service plug 290 is disconnected from the battery pack 2, the MCU 20 outputs information on whether the service plug 290 is opened or closed to an external display unit (not shown). For example, the MCU 20 outputs a signal indicating that the service plug 290 is disconnected from the battery pack 2.

In general, the internal power supply unit 30 supplies power to the BMS 1 using an auxiliary (backup) battery (not shown). The internal power supply unit 30 may perform a charging operation through an external power supply unit. In an exemplary embodiment, in a case where the battery pack 2 of the present invention is used in a hybrid electric vehicle (HEV), or the like, the internal power supply unit 30 may be supplied with power from a lead-acid battery of a hybrid or electric vehicle to perform a charging operation. In addition, the internal power supply unit 30 may supply a constant voltage to the closed loop 293 formed by the loop current measuring unit 140 and the service plug 290.

The cell balancing unit 40 performs balancing operations between states of charge and discharge of battery cells constituting each of the subpacks 210 to 280 of the battery pack 2. That is to say, the cell balancing unit 40 discharges overcharged cells (i.e., relatively less discharged cells) of the battery cells, and charges relatively less charged cells (i.e., over-discharged cells) of the battery cells, thereby maintaining the respective battery cells at uniform SOC levels.

The storage unit 50 stores various data values, including data about SOC, SOH, etc., immediately before the BMS 1 is turned off. Accordingly, when the BMS 1 is turned on afterward, the MCU 20 can read the data values corresponding to data values stored at the time when the BMS 1 was turned off previously. The storage unit 50 stores the present levels of SOC and SOH data when the power source of the BMS 1 is turned off. To this end, an electrically erasable programmable read only memory (EEPROM) may be used as the storage unit 50. According to some embodiments, the storage unit 50 may be an EEPROM but the present invention is not limited thereto.

The communication unit 60 communicates with a motor controller (not shown), an engine control unit (not shown) on other "load control" units. The communication unit 60 allows the motor to utilize power of the battery pack 2. In addition, the communication unit 60 may allow an engine to be driven when the motor is not driven.

The protection circuit unit 70 protects the battery pack 2 from external impacts, over-current, over-voltage, etc.

The power-on reset unit 80 resets the overall system when the BMS 1 is turned on.

The external interface 90 allows the cooling fan 4 to be electrically coupled to the MCU 20. In addition, the external interface 90 allows the main switch 6 of the charge and discharge current lines 11 and 12 coupled to the battery pack 2 to be coupled to the MCU 20.

The battery pack 2 includes the plurality of subpacks 210 to 280 and the service plug 290 coupled between the plurality of subpacks 210 to 280. To supply a voltage and power suitable for a load, the battery pack 2 includes the plurality of subpacks 210 to 280. According to some embodiments of the present invention, the battery pack 2 illustrated in FIG. 1 includes eight subpacks 210 to 280, each subpack including five battery cells. The present invention is not, however, limited to the exemplary embodiments shown.

The service plug 290 is coupled between the subpacks 210 to 280. In order to protect the battery pack 2 from over-charge or over-current, the service plug 290 may incorporate a safety switch 291 and a fuse 292. The service plug 290 is normally maintained in a state in which it is coupled between the subpacks 210 to 280.

However, in an abnormal event where failures occur in the secondary battery, appropriate measures, such as maintenance, should be undertaken. In such a case, the service plug 290 is opened to prevent the current from flowing through the battery pack 2. Here, the service plug 290 is opened by physically disconnecting one of a pair of plug terminals (see 290a and 290b of FIG. 1) coupled to the subpacks 210 to 280 from the subpacks 210 to 280. When the service plug 290 is opened, the plug terminal 290b which forms the closed loop 293 in cooperation with the sensing unit 10 is also disconnected from the service plug 290. As a result, when the service plug 290 is opened, the sensing unit 10 outputs the maximum measurable values of cell voltages, subpack voltages, battery cell voltages and the current measured by the sensing unit 10 is 0 A.

As described above, in the secondary battery according to the present invention, a service plug is provided between a plurality of subpacks of a battery pack, and when the service plug is opened for maintenance work, at least one of the group consisting of the battery cell voltage, subpack voltages, overall voltage and current of the battery pack are measured by a battery management system. Thus, it can be determined whether the service plug is opened or closed, ultimately ensuring operator safety.

Although exemplary embodiments of the present invention have been described in detail, it should be understood that many variations and modifications of the basic inventive concept herein described, which may appear to those skilled in the art, will still fall within the spirit and scope of the exemplary embodiments of the present invention as defined by the appended claims.

What is claimed is:

1. A secondary battery comprising:
    a battery pack including a plurality of interconnected subpacks, each of the subpacks comprising one or more battery cells;
    a service plug coupled between a first subpack and a second subpack of the plurality of subpacks via a pair of plug terminals adapted to control interconnection of the plurality of battery cells according to a state of the pair of plug terminals; and
    a battery management system electrically coupled to the battery pack and the service plug, the battery management system being electrically coupled to the service plug to form a closed loop, the battery management system being configured to determine the state of the pair of plug terminals by applying a current to the closed loop,
    wherein less than all of the subpacks are directly electrically connected to the service plug.

2. The secondary battery of claim 1, wherein the battery management system is configured to determine that the service plug is opened when measuring at least one selected from the group consisting of a maximum measurable value constituting a voltage of the battery pack, and a zero value for a current of the battery pack, and when the voltage of the battery cell measured by the battery management system is the maximum measurable value.

3. The secondary battery of claim 1, wherein the battery management system is further configured to determine whether the service plug is opened or closed by also measuring a voltage or a current of the battery pack.

4. A secondary battery comprising:
    a battery pack including a plurality of interconnected battery cells;
    a service plug coupled between each of the plurality of battery cells via a pair of plug terminals adapted to control interconnection of the plurality of battery cells according to a state of the pair of plug terminals; and
    a battery management system electrically coupled to the battery pack and the service plug configured to determine the state of the pair of plug terminals by measuring voltages of the plurality of battery cells electrically coupled to the service plug such that the pair of plug terminals of the service plug are both included in the measurement path, wherein the battery management system is further configured to determine whether the service plug is opened or closed by also measuring a voltage or a current of the battery pack, and wherein, when the voltage of the battery pack is a maximum measurable value and the current of the battery pack is zero, and when the voltages of the plurality of battery cells measured by the battery management system are the maximum measurable values, the battery management system determines that the service plug is opened.

* * * * *